(12) United States Patent
Zhang et al.

(10) Patent No.: US 8,239,723 B2
(45) Date of Patent: Aug. 7, 2012

(54) HARQ TIMING CONTROL IN WIRELESS COMMUNICATION SYSTEMS

(75) Inventors: Yujian Zhang, Beijing (CN); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 12/512,253

(22) Filed: Jul. 30, 2009

(65) Prior Publication Data

US 2011/0029833 A1 Feb. 3, 2011

Related U.S. Application Data

(60) Provisional application No. 61/142,582, filed on Jan. 5, 2009.

(51) Int. Cl.
*H04L 1/08* (2006.01)
(52) U.S. Cl. ....................................................... 714/749
(58) Field of Classification Search .................. 714/748, 714/749, 712; 370/276, 280, 281, 481, 314, 370/330
See application file for complete search history.

(56) References Cited

U.S. PATENT DOCUMENTS

| | | | |
|---|---|---|---|
| 7,792,067 B2 * | 9/2010 | Sheu et al. ..................... | 370/311 |
| 2003/0110435 A1 * | 6/2003 | Wu et al. ........................ | 714/748 |
| 2005/0201325 A1 | 9/2005 | Kang et al. | |
| 2006/0146762 A1 * | 7/2006 | Kuroda et al. ................ | 370/335 |
| 2007/0058595 A1 | 3/2007 | Classon et al. | |
| 2007/0300120 A1 * | 12/2007 | Kim et al. ..................... | 714/749 |
| 2008/0137562 A1 | 6/2008 | Li et al. | |
| 2008/0176577 A1 | 7/2008 | Bourlas et al. | |
| 2009/0276676 A1 * | 11/2009 | Lee et al. ...................... | 714/749 |
| 2009/0323564 A1 * | 12/2009 | Chiu ............................. | 370/280 |
| 2010/0131814 A1 * | 5/2010 | Chiu ............................. | 714/748 |

FOREIGN PATENT DOCUMENTS

WO 2010078583 A2 7/2010

OTHER PUBLICATIONS

Mo-Han Fong et al "Proposal for IEEE 802.16m HARQ Protocol and Timing" May 5, 2008, IEEE C802.16m-08/353, pp. 1-16.*
Eoljanin "Hybrid ARQ in Wireless Networks", Mathematical Sciences Research Center, Bell Labs, Mar. 19, 2003, pp. 1-59.*
International Search Report and Written Opinion Received for PCT Patent Application No. PCT/US2010/020136, mailed on Aug. 17, 2010, 9 Pages.
Abrishami, Ray et al. IEEE Standard for Local and Metropolitan Area Networks. "Air Interface for Broadband Wireless Access Systems." May 29, 2009. 2004 pages.
Hamiti, Shkumbin. IEEE 802.16 Broadband Wireless Access Working Group. "IEEE 802.16m System Description Document [Draft]." Dec. 12, 2008. 162 pages.

* cited by examiner

Primary Examiner — Phung M Chung
(74) Attorney, Agent, or Firm — Carrie A. Boone, P.C.

(57) ABSTRACT

An apparatus and method for HARQ timing control in wireless communication systems is disclosed. The apparatus and method provides one unified algorithm to determine HARQ timing, with consideration of the downlink-to-uplink ratio, the presence of legacy zones, support of relay zones, and variable transmission time interval length. The disclosed algorithm guarantees sufficient processing time, at both the transmit and receive sides. Further, retransmissions occur in a periodic manner, simplifying the implementation.

28 Claims, 17 Drawing Sheets

HARQ TIMING CONTROL IN WIRELESS COMMUNICATION SYSTEMS

CROSS-REFERENCE TO RELATED APPLICATIONS

This application claims priority under 35 U.S.C. 119(e) to U.S. Provisional Patent Application No. 61/142,582, entitled, ADVANCED WIRELESS COMMUNICATION SYSTEMS AND TECHNIQUES, filed on Jan. 5, 2009.

TECHNICAL FIELD

This application relates to hybrid automatic repeat request (HARQ) and, more particularly, to HARQ under IEEE 802.16m.

BACKGROUND

Hybrid automatic repeat request (HARQ) is widely supported in current state-of-the-art wireless communication standards. Under automatic repeat request (ARQ), error detection information is added to data before transmission, ensuring that the receiver is able to decode the data. With HARQ, additional forward error correction (FEC) bits are also added to the data. From the timing relationship point of view, HARQ can be categorized as asynchronous HARQ and synchronous HARQ.

Asynchronous HARQ refers to the case that (re)transmissions for a certain HARQ process may occur at any time. Explicit signaling of the HARQ process number is therefore required for asynchronous HARQ.

Synchronous HARQ refers to the case where (re)transmissions for a certain HARQ process are restricted to occur at known time instants. No explicit signaling of the HARQ process number is required for synchronous HARQ, because the process number may be derived from, for example, the sub-frame number.

In addition to the categorization of HARQ as either synchronous or asynchronous, HARQ timing is also defined to allow precise operation of the transmitter and receiver. The timing relationship includes the relationship between control signaling, associated transmission, associated feedback, and associated retransmission. Such timing relationships may be defined explicitly or implicitly. For explicit timing relationships, the control signaling includes some fields to indicate the timing relationship. Implicit timing relationships are implemented by defining some rules on timing.

Several wireless communication standards are defined by the Institute of Electrical and Electronics Engineers (IEEE), including 802.16e (broadband wireless access) and 802.16m (advanced air interface standard). Under IEEE 802.16e, asynchronous HARQ is used for both downlink (DL) and uplink (UL) transmissions. Under 802.16m, asynchronous HARQ is used in the downlink while synchronous HARQ is used for uplink transmissions. There are various factors affecting HARQ timing:

- Number of sub-frames per frame: in 5/10/20 MHz systems bandwidth, there are 8 sub-frames per frame. However, in 7 and 8.75 MHz system bandwidth, there are only 6 and 7 sub-frames per frame, respectively
- Variable transmission time interval (TTI) length: one TTI might contain multiple sub-frames
- Legacy IEEE 802.16e zones: when mixed with legacy zones, the available downlink/uplink sub-frames for 802.16m transmissions are different
- Relay zones: HARQ timing should be defined for the base station (BS), the mobile station (MS), and the relay station (RS)
- Availability of an acknowledge channel (ACKCH): when n=2 is configured for a user-specific control channel (USCCH), some downlink sub-frames do not contain USCCH, such that the downlink ACKCH cannot be transmitted (USCCH is also known as assignment A-MAP)

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, an apparatus and method for HARQ timing control in wireless communication systems is disclosed. The apparatus and method provides one unified algorithm to determine HARQ timing, with consideration of the downlink-to-uplink ratio, the presence of legacy zones, support of relay zones, and variable transmission time interval length. The disclosed algorithm guarantees sufficient processing time, at both the transmit and receive sides. Further, retransmissions occur in a periodic manner, simplifying the implementation.

Figure 1:
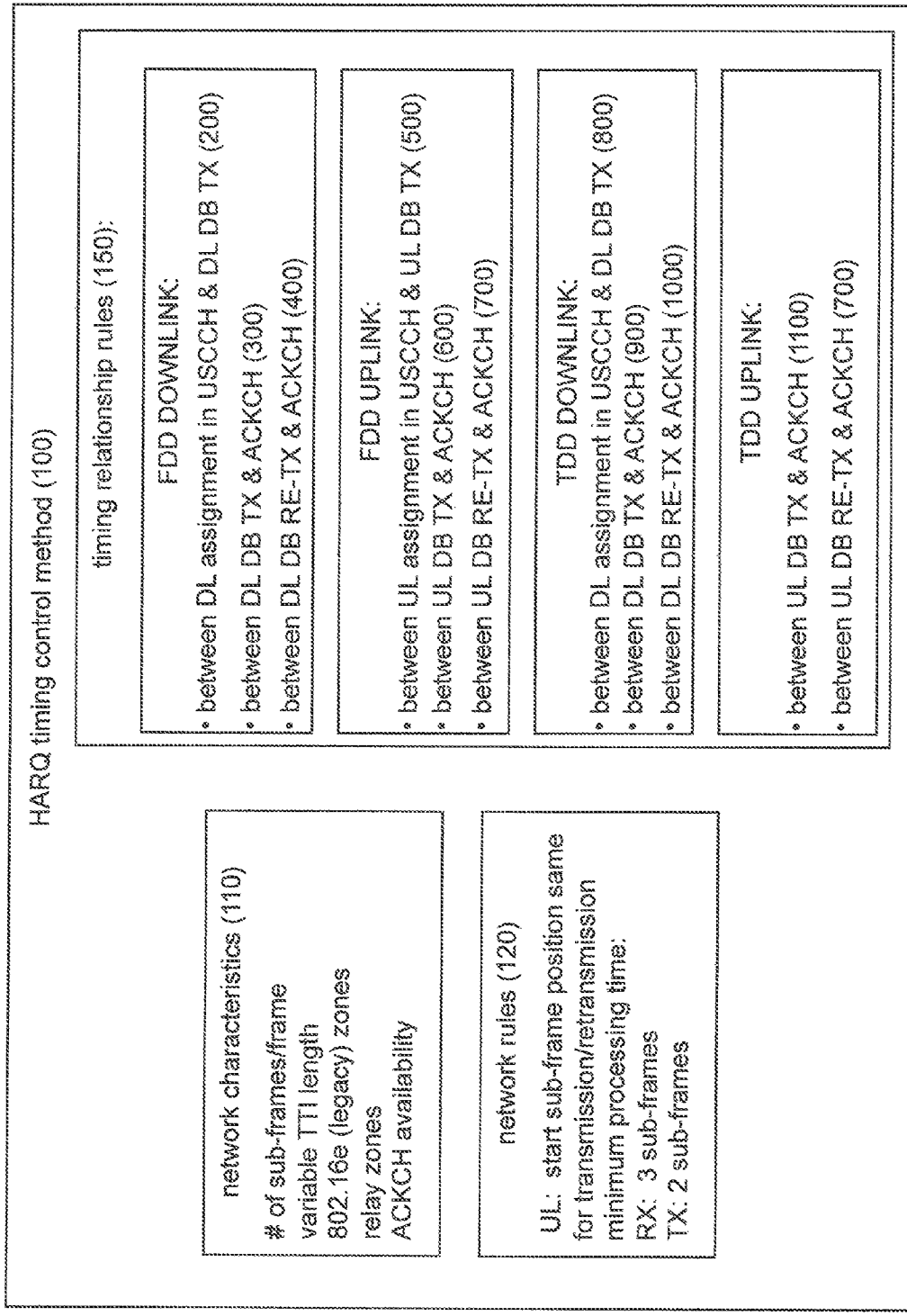
FIG. 1 is a block diagram of a HARQ timing control method, according to some embodiments.

FIG. 1 is a schematic block diagram of a HARQ timing control method 100, according to some embodiments. As described herein, the HARQ timing control method 100 generates timing relationship rules related to various HARQ transmissions. In generating the timing relationship rules, the HARQ timing control method 100 supports the advanced air interface standard (802.16m). (Coexistence with the legacy standard is supported by the HARQ timing control method 100 as well.) Further, the HARQ timing control method 100 considers network characteristics 110. In some embodiments, network characteristics 110 include the number of sub-frames per frame, variable TTI length, legacy zones, relay zones, and ACKCH availability. Finally, the method 100 considers network rules 120. In some embodiments, the network rules 120 specify that, for the uplink, the start sub-frame position is the same for transmission and retransmission. The network rules 120 may specify other rules, such as the minimum processing time for transmission and retransmission. The HARQ timing control method 100 may satisfy other standards, network characteristics 110, and network rules 120.

Table 1 is a listing of the timing relationship rules 150 generated by the HARQ timing control method 100. In FIG. 1, the timing relationship rules 150 are divided into FDD downlink rules, FDD uplink rules, TDD downlink rules, and TDD uplink rules, with DB being shorthand for data burst, TX being short for transmission, and RE-TX being short for retransmission.

TABLE 1

Timing relationship rules

| timing relationship between: | equation | rule | figure | method |
|---|---|---|---|---|
| DL assignment in USCCH & DL DB TX | none | 200 | 3 | FDD |
| DL DB TX & ACKCH | 1 or 2 | 300 | 4 | FDD |
| DL DB RE-TX & ACKCH | 3 or 3' | 400 | 5 | FDD |
| UL assignment in USCCH & UL DB TX | 4 | 500 | 7 | FDD |
| UL DB TX & ACKCH | 5-8 | 600 | 8 | FDD |
| UL DB RE-TX & ACKCH | 3 | 700 | 9 | FDD |
| DL assignment in USCCH & DL DB TX | none | 800 | 12 | TDD |
| DL DB TX & ACKCH | 9 or 10 | 900 | 13 | TDD |
| DL DB RE-TX & ACKCH | 3 | 1000 | 14 | TDD |
| UL DB TX & ACKCH | 11-14 | 1100 | 16 | TDD |
| UL DB RE-TX & ACKCH | 3 | 700 | 9 | TDD |

The HARQ timing control method 100 operates according to some network rules 120, in some embodiments:

For uplink transmissions, the start sub-frame position for retransmission is the same as for the initial transmission The minimum processing time for the receiver side the minimum processing time for the transmitter side In some embodiments, the minimum processing time for the receiver side is two sub-frames while, for the transmitter side, the minimum processing time is three sub-frames. In other embodiments, the minimum processing time is two sub-frames for the receiver side and transmitter side; in still other embodiments, the minimum processing time is three sub-frames for both the receiver and transmitter sides. The network rules 120, which keep track of this information, are used by the HARQ timing control method 100 to establish timing rules in support of 802.16m transmissions.

As used herein, the frames are numbered in ascending order. If the last frame of a super-frame is denoted as frame m, then the first frame of the next super-frame is denoted as frame m+1. A super-frame contains four frames (i.e. is about 20 ms long).

Within each frame, sub-frames are numbered in ascending order, with index n, starting from 0. Sub-frame index n is numbered continuously within the frame, irrespective of whether the sub-frame is in the downlink or in the uplink, or whether the sub-frame belongs to the legacy 802.16e zone or not. For example, for an eight-sub-frame frame, n=0 denotes the first sub-frame, while n=7 denotes the last sub-frame.

Table 2 includes notations that are used herein, as well as a definition for each. Note that for generality, symbols $N_{sf}$, $N_{TTI}$, $P_{Rx}$, $P_{Tx}$, and $n_{USCCH}$ are used in HARQ timing equations defined for the HARQ timing control method 100. However, any substitution of these symbols with valid numbers may be seen alternative embodiments of the HARQ timing control method 100.

TABLE 2

HARQ timing control method notations

| | |
|---|---|
| $\lfloor x \rfloor$ | The floor of x, i.e., the largest integer less than or equal to x |
| $\lceil x \rceil$ | The ceiling of x, i.e., the smallest integer greater than or equal to x |
| pair(m, n) | Starting sub-frame position of data burst (re)transmission |
| pair(m', n') | Sub-frame position for ACKCH associated with data burst (re)transmission |
| pair(m", n") | Starting sub-frame position of data burst retransmission associated with data burst (re)transmission (m, n) |

TABLE 2-continued

HARQ timing control method notations

| | |
|---|---|
| pair($m_U$, $n_U$) | Sub-frame position of USSCH scheduling data burst (re)transmission (m, n) |
| $N_{sf}$ | Total number of sub-frames per frame |
| $N_{TTI}$ | TTI length of data burst (re)transmission in terms of # of sub-frames |
| $P_{Rx}$ | Receive processing time in terms of # of sub-frames. Preferred value for $P_{Rx}$ is 3, however, $P_{Rx}$ may be greater than 2 |
| $P_{Tx}$ | Transmit processing time in terms of # of sub-frames. Preferred value for $P_{Tx}$ is 2, however, $P_{Tx}$ may be greater than 2 |
| $n_{USCCH}$ | USCCH (aka assignment A-MAP) transmission frequency. USCCH regions are located $n_{USCCH}$ sub-frames apart. If a USCCH region is allocated in sub-frame n, the next USCCH region is in sub-frame n + $n_{USCCH}$ of the same frame. The value of $n_{USCCH}$ is 1 or 2. Other values of $n_{USCCH}$ (e.g., 3 and 4) are to be studied in the future |

Generalized FDD Frame Structure

Figure 2:
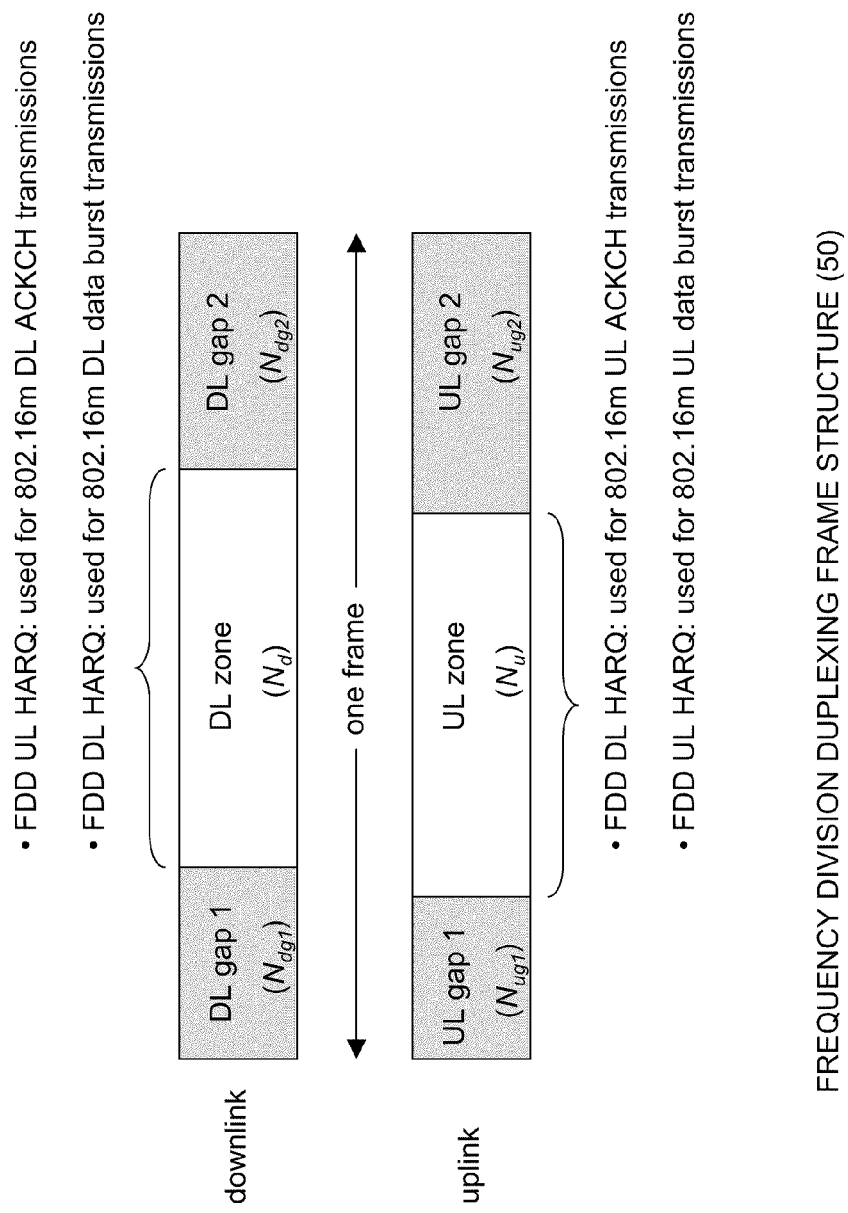
FIG. 2 is the frame structure used by the HARQ timing control method of FIG. 1 for frequency-division duplexing transmissions, according to some embodiments.

FIG. 2 illustrates the frame structure 50 used by the HARQ timing control method 100 for frequency-division duplexing (FDD). With frequency-division duplexing, the transmitter and receiver operate at different carrier frequencies. The transmitter and receiver are each able to simultaneously receive and transmit, with the frequencies altered for sending versus receiving. In FIG. 2, the downlink zone consists of $N_d$ sub-frames, while the uplink zone consists of $N_u$ sub-frames. There are possibly two gap, or idle, regions, with lengths of $N_{dg1}$ and $N_{dg2}$ sub-frames for the downlink, and lengths of $N_{ug1}$ and $N_{ug2}$ sub-frames for the uplink. Each of $N_{dg1}$, $N_{dg2}$, $N_{ug1}$, and $N_{ug2}$ may have a value of zero. Gaps (idle regions) in the downlink and uplink frames of FIG. 1 are not the same as transmission gaps.

Detailed definitions of the gaps are provided for downlink and uplink HARQ separately. In some embodiments, the following relationships are satisfied by the HARQ timing control method 100:

$$N_{sf}=N_{dg1}+N_d+N_{dg2}=N_{ug1}+N_u+N_{ug2}$$

Note that for generality, symbols $N_{dg1}$, $N_{dg2}$, $N_{ug1}$, and $N_{ug2}$ are used in the HARQ timing equations defined below. However, in some embodiments, these symbols are replaced with valid numbers. For example, when $N_{ug2}=0$, the term $N_{ug2}$ does not exist in the HARQ timing equations, which may be seen as one variant of the HARQ timing control method 100.

FDD Downlink HARQ

For FDD downlink HARQ, the downlink zone in FIG. 2 includes sub-frames that are used for IEEE 802.16m downlink data burst transmissions. All other sub-frames within one frame are categorized as downlink gaps. For FDD downlink HARQ, the uplink zone in FIG. 2 includes sub-frames that are used for IEEE 802.16m uplink ACKCH transmissions. All other sub-frames within one frame are categorized as uplink gaps.

Figure 3:
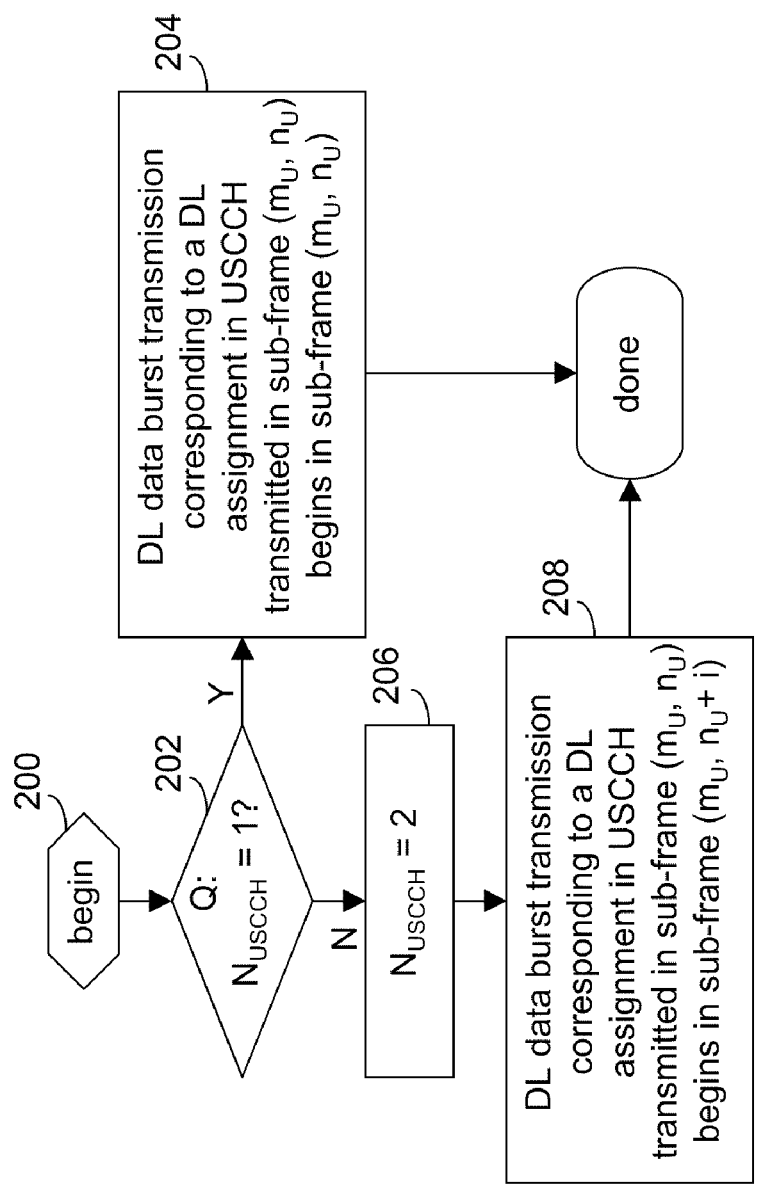
FIG. 3 is a flow diagram showing a timing relationship rule between downlink assignment in USCCH and downlink data burst transmission (FDD) generated by the HARQ timing control method of FIG. 1, according to some embodiments.

Timing Relationship Between DL Assignment in USCCH and DL Data Burst Transmission FIG. 3 is a flow diagram depicting a timing relationship rule 200 between the downlink assignment in USCCH and the downlink data burst transmission (FDD), according to some embodiments. When $n_{USCCH}=1$ (block 202), the downlink data burst transmission corresponding to a downlink assignment (in USCCH) transmitted in sub-frame ($m_U$,$n_U$) shall begin in sub-frame ($m_U$,$n_U$), i.e., m=$m_U$,n=$n_U$, in some embodiments (block 204). When $n_{USCCH}=2$, since, from Table 2, $n_{USCCH}$ may only be 1 or 2 (block 206), there is one bit, i∈{0,1} in the downlink assignment (in USCCH) transmitted in sub-frame ($m_U$,$n_U$), and the corresponding downlink data burst transmission shall begin in sub-frame ($m_U$,$n_U$+i), i.e., m=$m_U$,n=$n_U$+i (block 208). Note that when $N_d$ is odd and $n_U$=$N_{dg1}$+$N_d$-1, i should be zero only, in some embodiments.

Timing Relationship Between DL Data Burst Transmission and ACKCH

Figure 4:
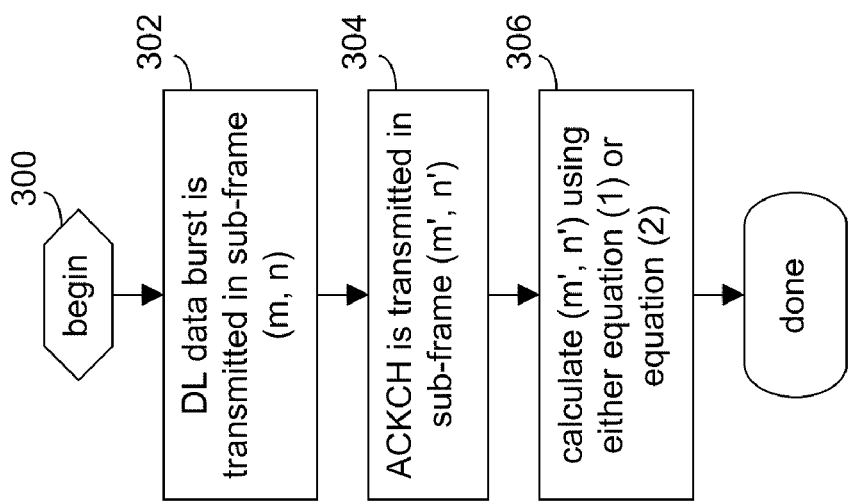
FIG. 4 is a flow diagram showing a timing relationship rule between downlink data burst transmission and ACKCH generated by the HARQ timing control method of FIG. 1, according to some embodiments.

FIG. 4 is a flow diagram depicting a timing relationship rule 300 between the downlink data burst transmission and ACKCH (FDD), according to some embodiments. For a downlink data burst with the starting sub-frame transmitted in sub-frame (m,n) (block 302), ACKCH is transmitted in sub-frame (m',n') (block 304). Two methods may be used to calculate (m',n') (block 306). One method is optimized to minimize ACKCH latency, with the calculation given in equation (1):

$$m'=m+\lfloor(n+N_{TTI}+P_{Rx}+N_{ug2})/N_{sf}\rfloor$$

$$n'=\max(N_{ug1},n+N_{TTI}+P_{Rx}-(m'-m)N_{sf}) \quad (1)$$

In some embodiments, another method is optimized to distribute ACKCH uniformly with the calculation given in equation (2):

$$k=N_d-N_{TTI}+1$$

$$m'=m+\lfloor(n+N_{TTI}+P_{Rx}+N_{ug2})/N_{sf}\rfloor$$

$$n'=\max(N_{ug1}+\lfloor(n-N_{dg1}+P_{Rx}1)\bmod k\cdot N_u/k\rfloor,n+N_{TTI}+P_{Rx}-(m'-M)N_{sf}) \quad (2)$$

Which equation is used may be either fixed in a standard, or may be indicated per configuration or per mobile station.

Timing Relationship Between DL Data Burst Retransmission and ACKCH

Figure 5:
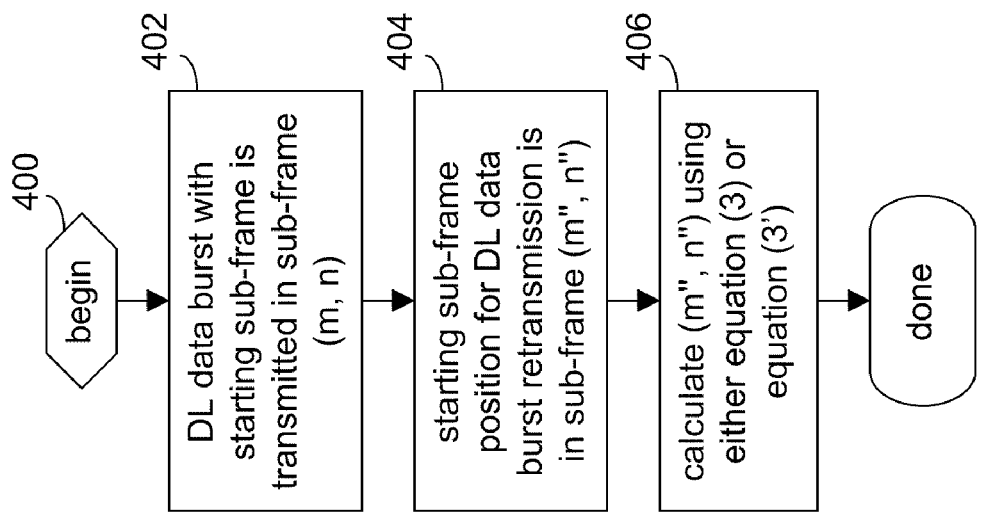
FIG. 5 is a flow diagram showing a timing relationship rule between downlink data burst retransmission and ACKCH generated by the HARQ timing control method of FIG. 1, according to some embodiments.

FIG. 5 is a flow diagram depicting a timing relationship rule 400 between the downlink data burst retransmission and ACKCH (FDD), according to some embodiments. For a downlink data burst with the starting sub-frame transmitted in sub-frame (m,n) (block 402), the starting sub-frame position for downlink data burst retransmission is in sub-frame (m", n") (block 404). Since the downlink uses asynchronous HARQ, the timing for retransmission is controlled by the base station explicitly, in some embodiments. Equation (3), below, is a reference timing to guarantee both minimum transmission processing time and same starting sub-frame position for transmissions and retransmissions (block 406).

$$m''=m'+\lfloor(n'+P_{Tx}-n)/N_{sf}\rfloor$$

$$n''=n \quad (3)$$

Note that one equivalent method to calculate m" (given the constraints of the generalized frame structure 50 depicted in FIG. 2) is given by equation (3') as follows:

$$m'' = \begin{cases} m' & \text{if } n' + P_{Tx} < n \\ m' + 1 & \text{if } n' + P_{Tx} \geq n \end{cases} \quad (3')$$

Figure 6:
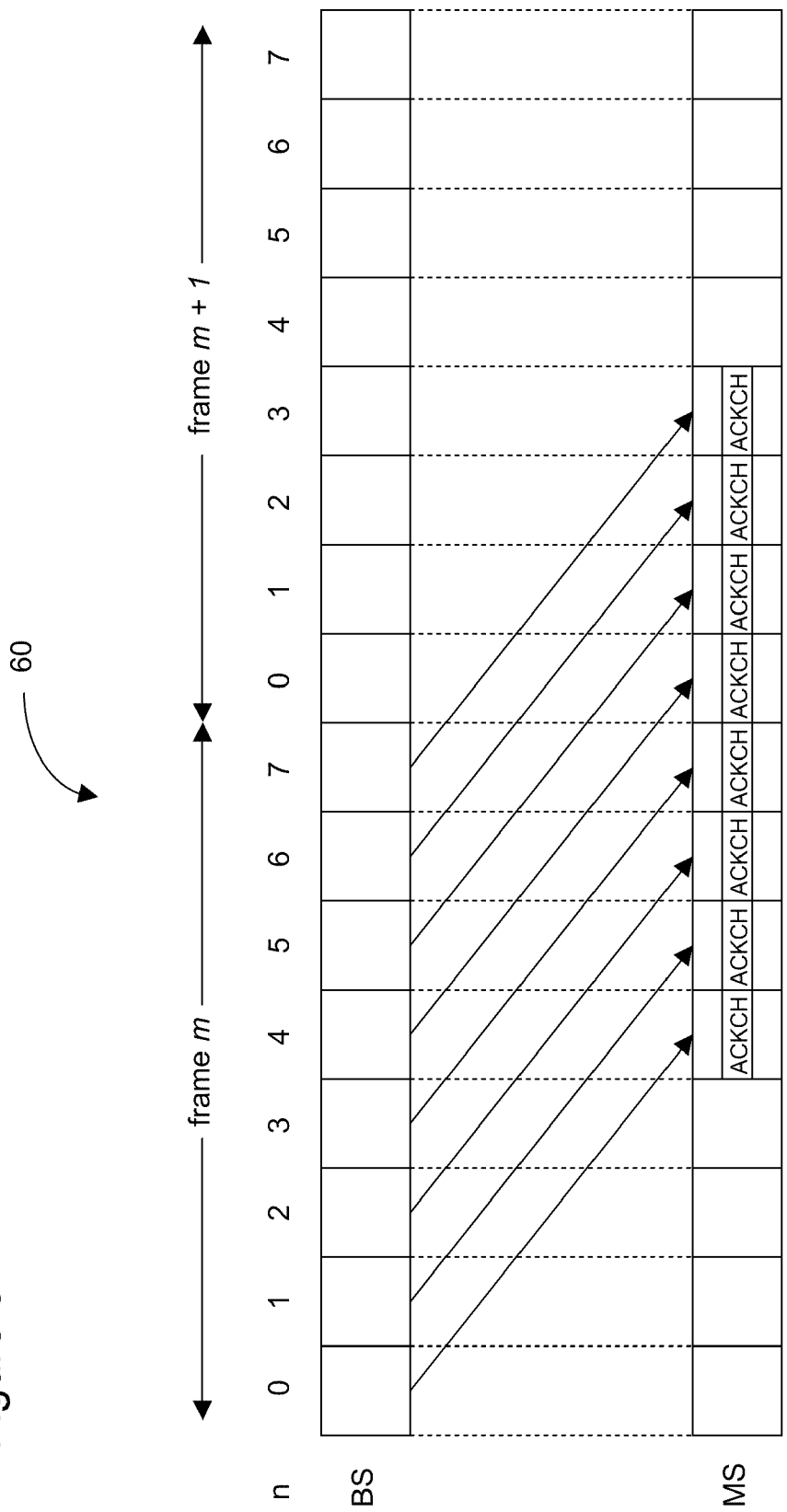
FIG. 6 is an illustration of two frames showing FDD downlink HARQ operation performed using the HARQ timing control method of FIG. 1, according to some embodiments.

FIG. 6 shows an example 60 for FDD downlink HARQ, according to some embodiments. In this example 60, there are no gaps present, i.e., $N_{dg1}=N_{dg2}=N_{ug1}=N_{ug2}=0$. There are eight sub-frames per frame, that is, $N_{sf}=8$. In addition, $N_{TTI}=1, n_{USCCH}=1$. Equation (1) and equation (2) are equivalent (just different embodiments), and the timing relationship between downlink data burst transmission and ACKCH is shown in FIG. 6. In this example, the distance between ACKCH and the corresponding downlink data burst transmission is three sub-frames. For instance, ACKCH for data transmission in downlink sub-frame (m,0) is transmitted in the uplink sub-frame (m,4), while ACKCH for data transmission in the downlink sub-frame (m,5) is transmitted in the uplink sub-frame (m+1,1).

FDD UL HARQ

For FDD uplink HARQ, the downlink zone in FIG. 2 includes sub-frames that are used for IEEE 802.16m downlink ACKCH transmissions. All other sub-frames within one frame are categorized as downlink gaps. For FDD uplink HARQ, the uplink zone in FIG. 2 includes sub-frames that are used for IEEE 802.16m uplink data burst transmissions. All other sub-frames within one frame are categorized as uplink gaps.

Figure 7:
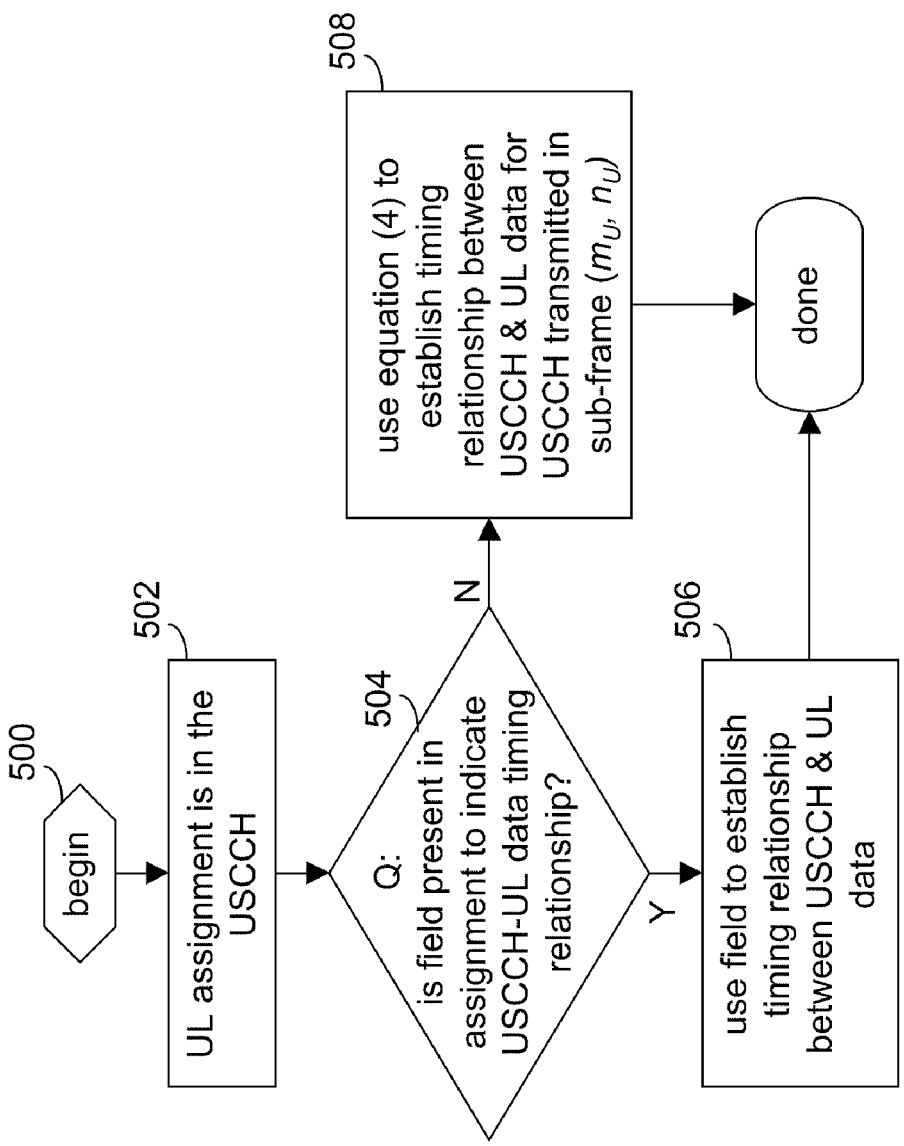
FIG. 7 is a flow diagram showing a timing relationship between uplink assignment in USCCH and uplink data burst transmission generated by the HARQ timing control method of FIG. 1, according to some embodiments.

Timing Relationship Between UL Assignment in USSCH and UL Data Burst Transmission FIG. 7 is a flow diagram depicting a timing relationship rule 500 between the uplink assignment in USCCH and the uplink data burst transmission (FDD), according to some embodiments. The uplink assignment is in the USCCH (block 502). In some embodiments, there is one field in the uplink assignment in USCCH to indicate the timing relationship between USCCH and associated uplink data (block 504). For example, the number of sub-frames between the uplink assignment sub-frame and the uplink data burst sub-frame is indicated. In this case, the field is used to establish the timing relationship between the USCCH and the uplink data (block 506).

In other embodiments, the timing relationship is calculated based on equation (4) below, assuming USCCH is transmitted in sub-frame $(m_U, n_U)$ while the starting sub-frame of uplink data transmission is in sub-frame (m,n) (block 508):

$$m = m_U + \lfloor (n_U + N_{TTI} + P_{Tx} + N_{ug2})/N_{sf} \rfloor$$

$$n = \max(N_{ug1}, n_U + N_{TTI} + P_{Tx} - (m - m_U)N_{sf}) \quad (4)$$

Timing Relationship Between UL Data Burst Transmission and ACKCH

Figure 8:
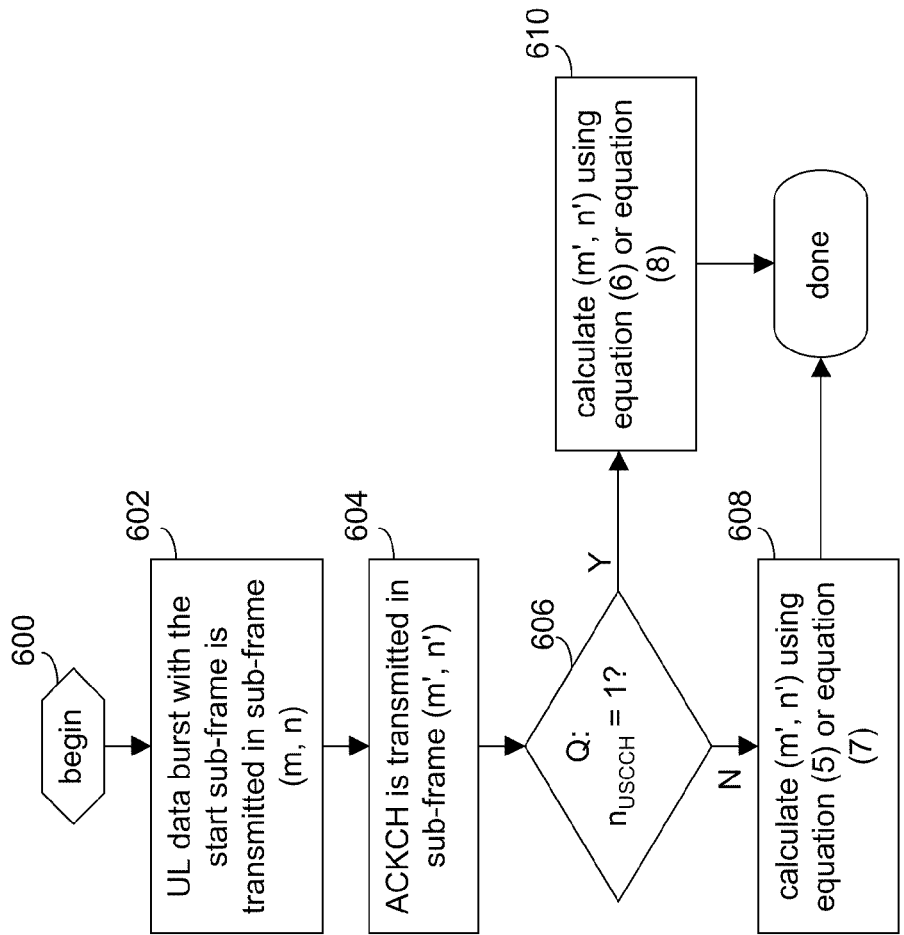
FIG. 8 is a flow diagram showing a timing relationship between uplink data burst transmission and ACKCH generated by the HARQ timing control method of FIG. 1, according to some embodiments.

FIG. 8 is a flow diagram depicting a timing relationship rule 600 between the uplink data burst transmission and ACKCH (FDD), according to some embodiments. For uplink data burst with the start sub-frame transmitted in sub-frame (m,n) (block 602), ACKCH is transmitted in sub-frame (m',n') (block 604). Two methods may be used to calculate (m',n'). One method is optimized to minimize ACKCH latency with the calculation given in equation (5) (block 608):

$$m' = m + \lfloor (n + N_{TTI} + P_{Rx} + N_d + N_{dg2} - 1 - n_{USCCH} \lfloor (N_d - 1) / n_{USCCH} \rfloor)/N_{sf} \rfloor$$

$$n' = N_{dg1} + \max(0, n_{USCCH} \lceil (n + N_{TTI} + P_{Rx} - (m' - m)N_{sf} - N_{dg1})/n_{USCCH} \rceil) \quad (5)$$

When $n_{USCCH}=1$ (block 606), equation (5) may be simplified into the following equation (block 610):

$$m' = m + \lfloor (n + N_{TTI} + P_{Rx} + N_{dg2})/N_{sf} \rfloor$$

$$n' = \max(N_{dg1}, n + N_{TTI} + P_{Rx} - (m' - m)N_{sf}) \quad (6)$$

In some embodiments, the HARQ timing control method 100 uses the following equation to distribute ACHCH uniformly (block 608):

$$k = N_u - N_{TTI} + 1$$

$$m' = m + \lfloor (n + N_{TTI} + P_{Rx} + N_d + N_{dg2} - 1 - n_{USCCH} \lfloor (N_d - 1)/n_{USCCH} \rfloor)/N_{sf} \rfloor$$

$$n' = N_{dg1} + n_{USCCH} \max(\lfloor (n - N_{ug1} + P_{Rx} + 1) \bmod k \cdot N_d / n_{USCCH} \cdot k \rfloor, \lceil (n + N_{TTI} + P_{Rx} - (m' - m)N_{sf} - N_{dg1})/n_{USCCH} \rceil) \quad (7)$$

When $n_{USCCH} 1$ (block 606), equation (7) may be simplified as follows (block 610):

$$k = N_u - N_{TTI} + 1$$

$$m' = m + \lfloor (n + N_{TTI} + P_{Rx} + N_{dg2})/N_{sf} \rfloor$$

$$n' = \max(N_{dg1} + \lfloor (n - N_{ug1} + P_{Rx} + 1) \bmod k \cdot N_d / k \rfloor, n + N_{TTI} + P_{Rx} - (m' - m)N_{sf}) \quad (8)$$

Which method is used may be fixed into a standard, or may be indicated per configuration or per mobile station.

Timing Relationship Between UL Data Burst Retransmission and ACKCH

Figure 9:
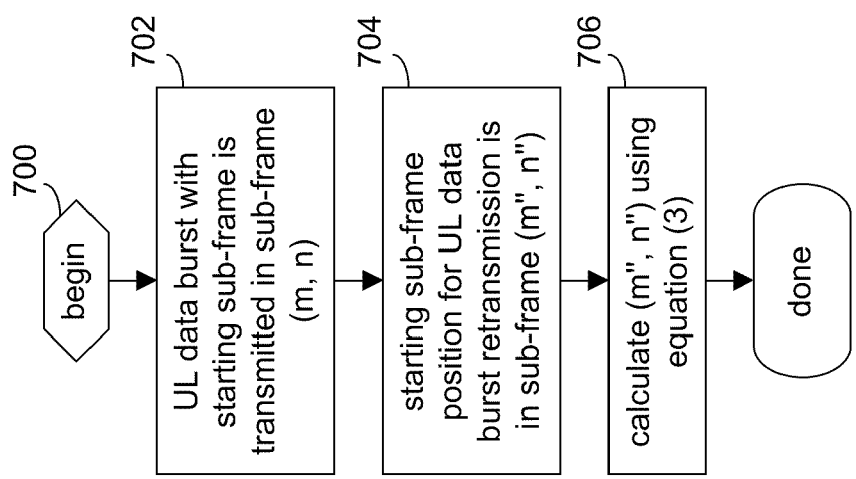
FIG. 9 is a flow diagram showing a timing relationship between uplink data burst retransmission and ACKCH generated by the HARQ timing control method of FIG. 1, according to some embodiments.

FIG. 9 is a flow diagram depicting a timing relationship rule 700 between the uplink data burst retransmission and ACKCH (FDD), according to some embodiments. For uplink data burst with the start sub-frame transmitted in sub-frame (m,n) (block 702), the start sub-frame position for uplink data burst retransmission is in sub-frame (m",n") (block 704). Equation (3) is used to calculate the start sub-frame position (m",n") of uplink data burst retransmission (block 706).

Figure 10:
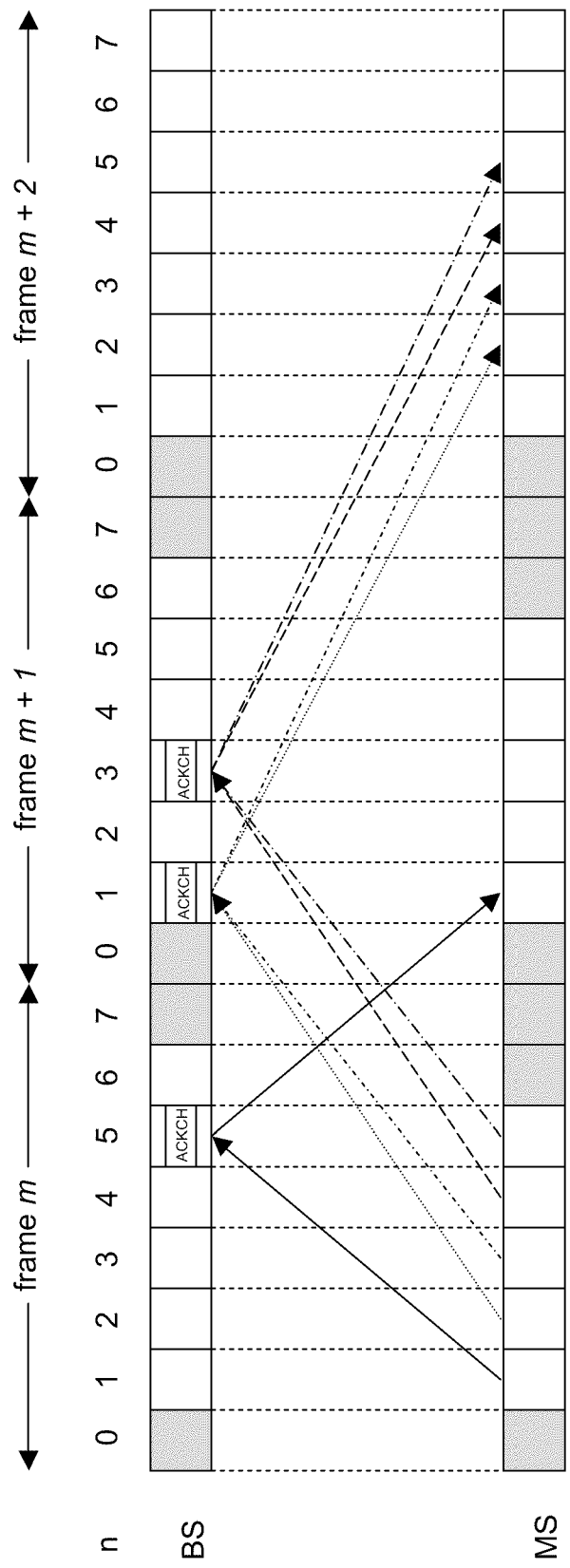
FIG. 10 is an illustration of three frames showing FDD uplink HARQ performed using the HARQ timing control method of FIG. 1, according to some embodiments.

FIG. 10 shows an example for FDD uplink HARQ, according to some embodiments. In this example, $N_{dg1}=N_{dg2}=N_{ug1}=1$ and $N_{ug2}=2$. There are eight sub-frames per frame, that is, $N_{sf}=8$. In addition, $N_{TTI}=1$, $n_{USCCH}=2$. Equations (7) and (3) are used to calculate HARQ timing. For instance, ACKCH for data transmission in the uplink sub-frame (m,1) is transmitted in the downlink sub-frame (m,5), with the uplink retransmission in sub-frame (m+1,1). ACKCH for data transmission in the uplink sub-frame (m,4) is transmitted in the downlink sub-frame (m+1,3), with the uplink retransmission in sub-frame (m+2,4).

Generalized TDD Frame Structure

Figure 11:
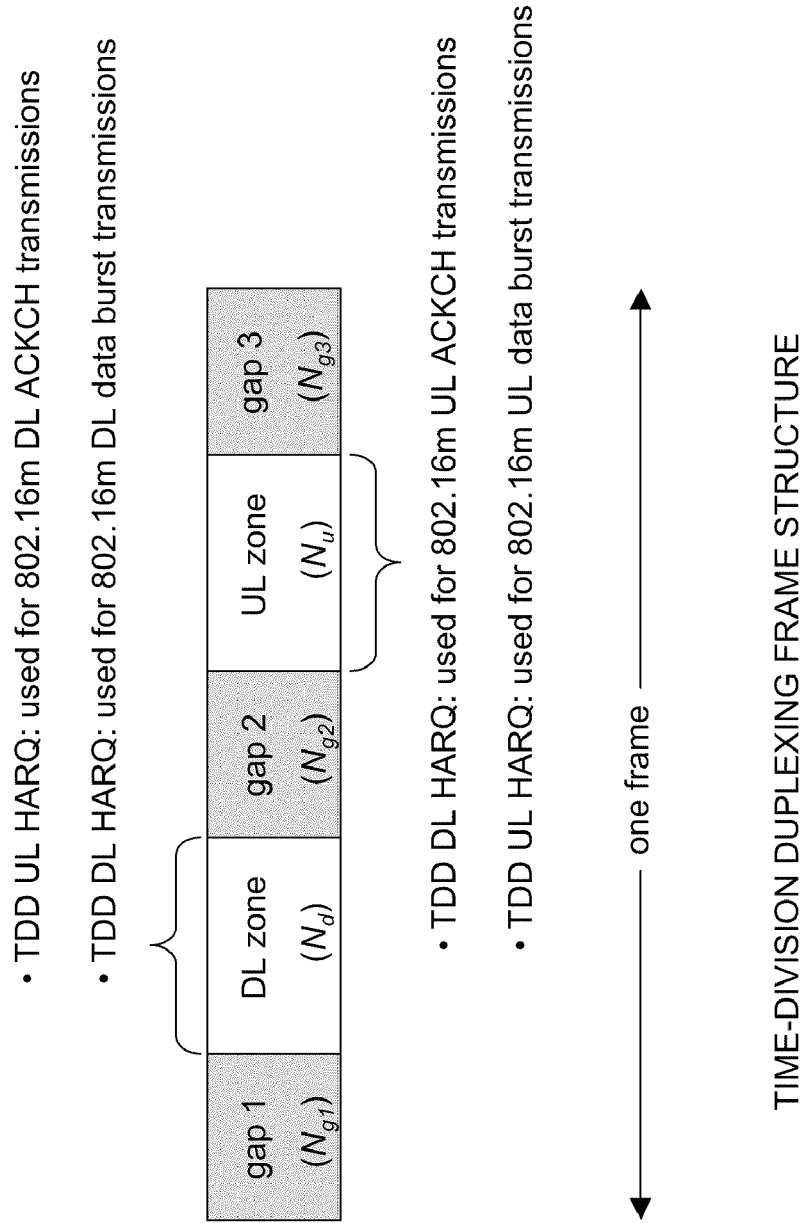
FIG. 11 is an illustration of a frame structure used by the HAQQ timing control method of FIG. 1 for TDD HARQ timing, according to some embodiments.

FIG. 11 illustrates the frame structure used for TDD HARQ timing, according to some embodiments. The downlink zone consists of $N_d$ sub-frames, while the uplink zone consists of $N_u$ sub-frames. There are possibly three gap regions with length of $N_{g1}$, $N_{g2}$, and $N_{g3}$ sub-frames. Each of $N_{g1}$, $N_{g2}$, and $N_{g3}$ may be zero.

Gaps in the downlink and uplink in FIG. 11 are not the same as transmissions gaps. Detailed definitions of the gaps are provided for downlink and uplink HARQ separately.

In some embodiments, the following relationship is satisfied:

$$N_{sf} = N_{g1} + N_d + N_{g2} + N_u + N_{g3}$$

Note that for generality, symbols, $N_{g1}$, $N_{g2}$, and $N_{g3}$ are used in HARQ timing equations defined herein. However, any substitution of these symbols with concrete numbers may be seen as a variant of the embodiments described herein. For example, when $N_{g3}=0$, the term, $N_{g3}$, does not exist in the HARQ timing equations, which can be seen as one variant of the described embodiments.

TDD Downlink HARQ

For time-division duplexing downlink HARQ, the downlink zone in FIG. 11 includes sub-frames that are used for IEEE 802.16m downlink data burst transmissions, while the uplink zone in FIG. 11 includes sub-frames that are used for IEEE 802.16m uplink ACKCH transmissions. Both the downlink zone and the uplink zone are associated with the same kind of transmissions, that is, base station-to-mobile station transmissions in the downlink or base station-to-relay station transmissions in the downlink. All other sub-frames within one frame are categorized as gaps.

Figure 12:
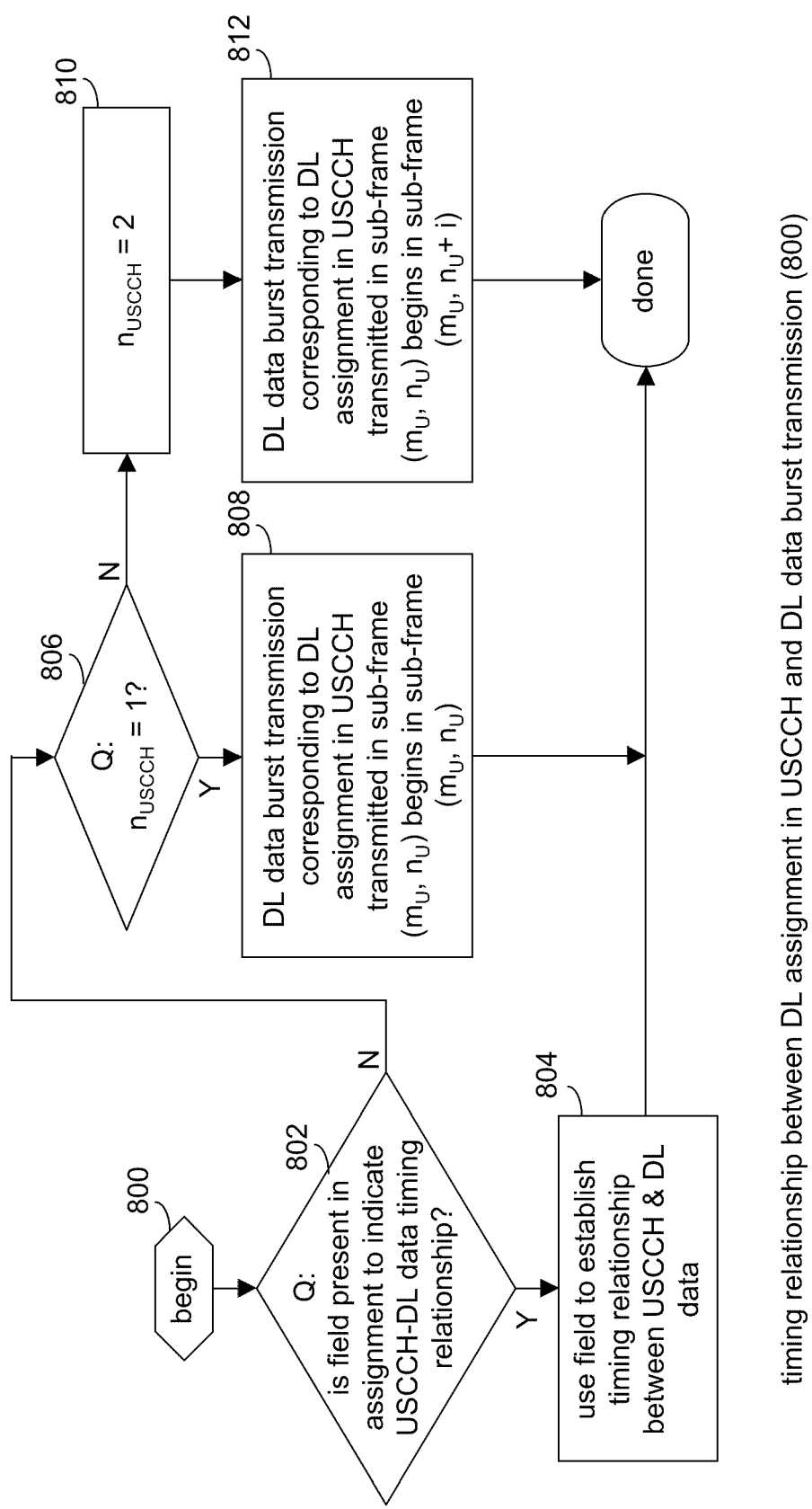
FIG. 12 is a flow diagram showing a timing relationship between downlink assignment in USCCH and downlink data burst transmission generated by the HARQ timing control method of FIG. 1, according to some embodiments.

Timing Relationship Between DL Assignment in USCCH and DL Data Burst Transmission FIG. 12 is a flow diagram depicting a timing relationship rule 800 between the downlink assignment in USCCH and the downlink data burst retransmission (TDD), according to some embodiments. One method for establishing a timing relationship is possible where that there is one field in the downlink assignment in USCCH to indicate the timing relationship between USCCH and the associated downlink data (block 802). For example, the number of sub-frames between the downlink assignment sub-frame and the downlink data burst sub-frame may be indicated. The field may thus be used to establish a timing relationship between the USCCH and downlink data (block 804).

In other embodiments, the timing relationship is calculated as follows. When $n_{USCCH}=1$ (block 806), the downlink data burst transmission corresponding to a downlink assignment (in USCCH) transmitted in sub-frame $(m_U, n_U)$ shall begin in sub-frame $(m_U, n_U)$, that is, $m=m_U, n=n_U$ (block 808). When $n_{USCCH}=2$ (block 810), there is one 1 bit i∈{0,1} in the downlink assignment (in USCCH) transmitted in sub-frame $(m_U, n_U)$, and the corresponding downlink data burst transmission shall begin in sub-frame $(m_U, n_U+i)$, i.e. $m=m_U, n=n_U+i$ (block 812). When $N_d$ is odd and $n_U=N_{g1}+N_d-1$, i should be zero only, in some embodiments. Which method is used may be either fixed in a standard, or may be indicated per configuration or per mobile station.

Timing Relationship Between DL Data Burst Transmission and ACKCH

Figure 13:
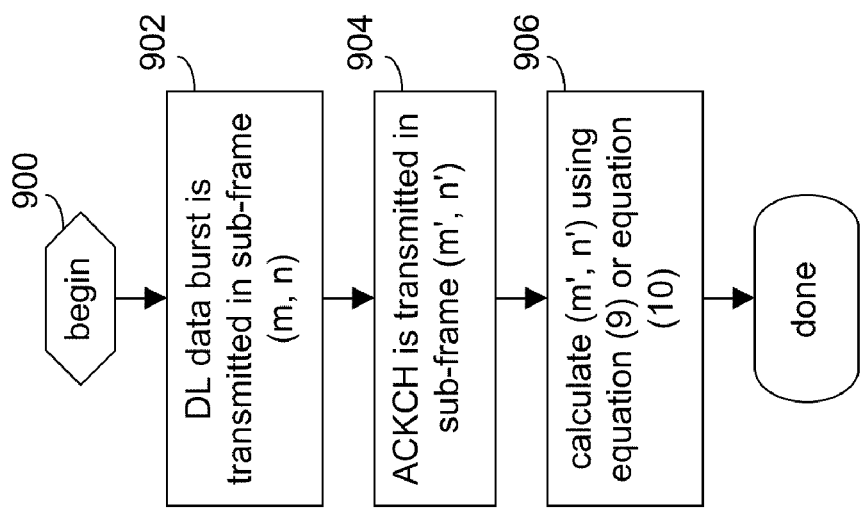
FIG. 13 is a flow diagram showing a timing relationship between downlink data burst transmission and ACKCH generated by the HARQ timing control method of FIG. 1, according to some embodiments.

FIG. 13 is a flow diagram depicting a timing relationship rule 900 between the downlink data burst transmission and ACKCH (TDD), according to some embodiments. For the downlink data burst with the starting sub-frame transmitted in sub-frame (m,n) (block 902), ACKCH is transmitted in sub-frame (m',n') (block 904). Two methods may be used to calculate (m',n'). One method is optimized to minimize ACKCH latency with the calculation given in equation (9) (block 906):

$$m'=m+\lfloor (n+N_{TTI}+P_{Rx}+N_{g3})/N_{sf} \rfloor$$

$$n'=\max(N_{g1}+N_d+N_{g2}, n+N_{TTI}+P_{Rx}-(m'-m)N_{sf}) \quad (9)$$

Another method is optimized to distribute ACKCH uniformly with the calculation given in equation (10) (block 906):

$$m'=m+\lfloor (n+N_{TTI}+P_{Rx}+N_{g3})/N_{sf} \rfloor$$

$$n'=\max(N_{g1}+N_d+N_{g2}+\lfloor (n-N_{g1})N_u/(N_d-N_{TTI}-1) \rfloor, n+N_{TTI}+P_{Rx}-(m'-m)N_{sf}) \quad (10)$$

Timing Relationship Between DL Data Burst Retransmission and ACKCH

Figure 14:
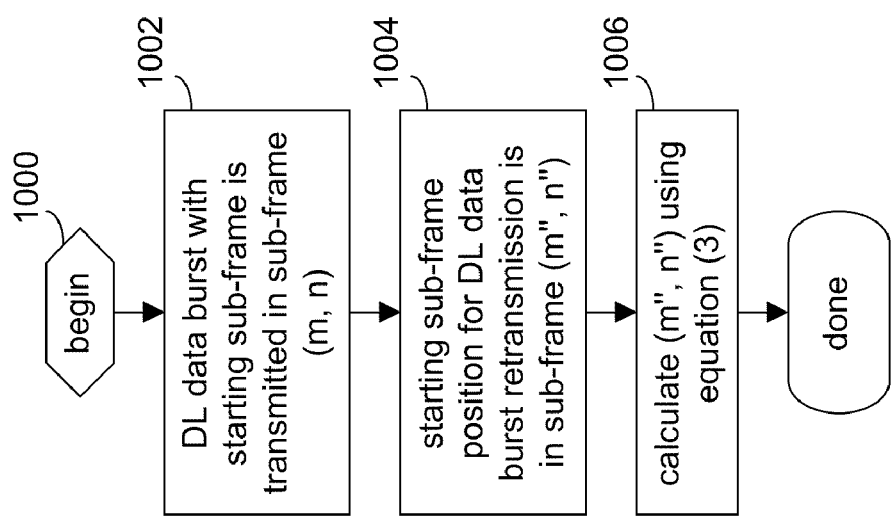
FIG. 14 is a flow diagram showing a timing relationship between downlink data burst retransmission and ACKCH generated by the HARQ timing control method of FIG. 1, according to some embodiments.

FIG. 14 is a flow diagram depicting a timing relationship rule 1000 between the downlink data burst retransmission and ACKCH (TDD), according to some embodiments. For downlink data burst with the starting sub-frame transmitted in sub-frame (m,n) (block 1002), the starting sub-frame position for downlink data burst retransmission is in sub-frame (m",n") (block 1004). Since the downlink uses asynchronous HARQ, the timing for retransmission is controlled by the base station explicitly. Equation (3) is a reference timing to guarantee both minimum transmit processing time and same starting sub-frame position for transmission and retransmissions (block 1006).

Figure 15:
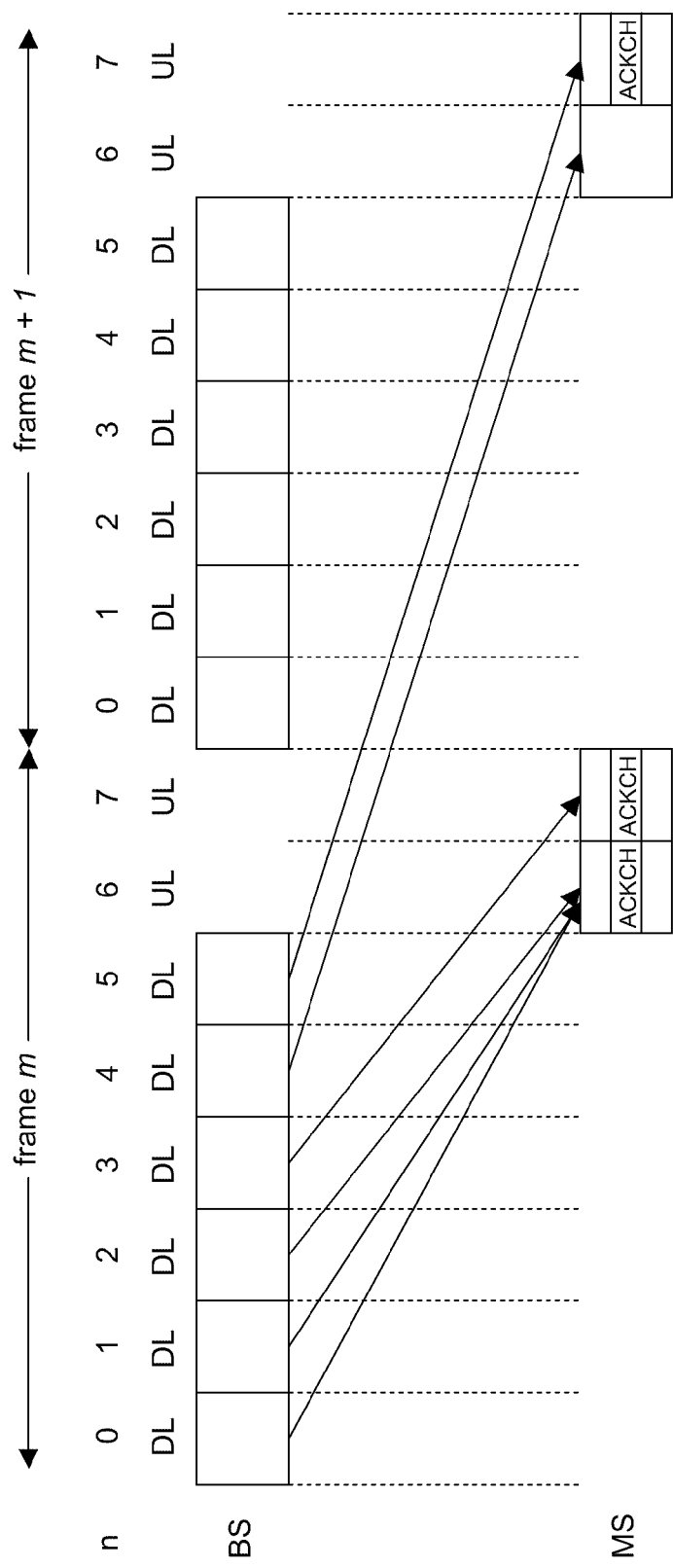
FIG. 15 is an illustration of TDD downlink HARQ used by the HARQ timing control method of FIG. 1, according to some embodiments.

FIG. 15 shows an example for time-division duplexing downlink HARQ 90, according to some embodiments. In this example, there are no gaps present, that is, $N_{g1}=N_{g2}=N_{g3}=0$. There are eight sub-frames per frame, i.e. $N_{sf}=8$. The downlink to uplink ratio (DL:UL) is 6:2, that is, $N_d=6$, and $N_u=2$. In addition, $N_{TTI}=1$, $n_{USCCH}=1$. Equation (10) is used to calculate HARQ timing. For instance, ACKCH for data transmission in the downlink sub-frame (m,0) is transmitted in the uplink sub-frame (m,6), while ACKCH for data transmission in the downlink sub-frame (m,5) is transmitted in the uplink sub-frame (m+1,7).

TDD UL HARQ

For time-division duplexing uplink HARQ, the downlink zone in FIG. 11 includes sub-frames that are used for IEEE 802.16m downlink ACKCH transmissions, while the uplink zone in FIG. 5 includes sub-frames that are used for IEEE 802.16m uplink data burst transmissions. Both the downlink and uplink zones are associated with the same kind of transmissions, e.g. mobile station-to-base station transmissions in the uplink, or relay station-to-base station transmissions in the uplink. All other sub-frames within one frame are categorized as gaps.

Timing Relationship Between UL Assignment in USCCH and UL Data Burst Transmission There is one field in the uplink assignment in USCCH to indicate the timing relationship between USCCH and the associated uplink data. For example, the number of sub-frames between the uplink assignment sub-frame and the uplink data burst sub-frame is indicated. In some embodiments, this field is used to establish a timing relationship between the uplink assignment in USCCH and the uplink data burst transmission.

Timing Relationship Between UL Data Burst Transmission and ACKCH

Figure 16:
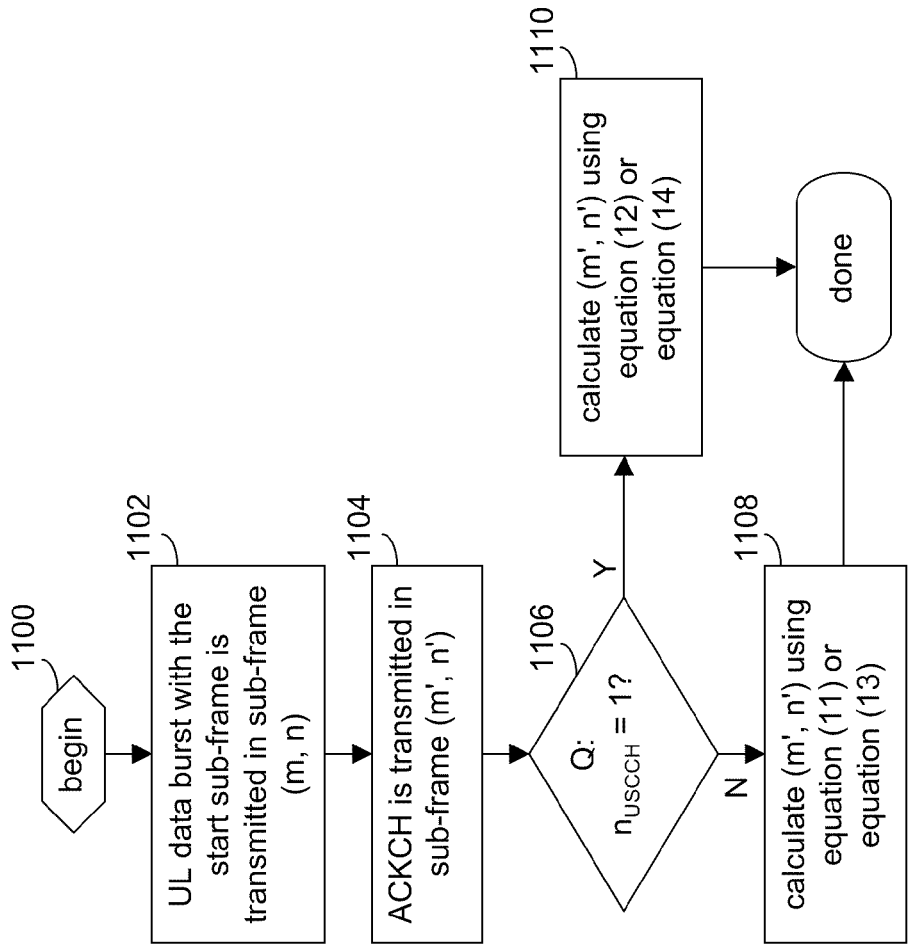
FIG. 16 is a flow diagram showing a timing relationship between uplink data burst transmission and ACKCH generated by the HARQ timing control method of FIG. 1, according to some embodiments.

FIG. 16 is a flow diagram depicting a timing relationship rule 1100 between the uplink data burst transmission and ACKCH (TDD), according to some embodiments. For uplink data burst with the starting sub-frame transmitted in sub-frame (m,n) (block 1102), ACKCH is transmitted in sub-frame (m',n') (block 1104). Two methods may be used to calculate (m',n'). One method is optimized to minimize ACKCH latency with the calculation given in equation (11) (block 1108):

$$m'=m+\lfloor (n+N_{TTI}+P_{Rx}+N_d+N_{g2}+N_u+N_{g3}-1-n_{USCCH}\lfloor (N_d-1)/n_{USCCH} \rfloor)/N_{sf} \rfloor$$

$$n'=N_{g1}+\max(0, n_{USCCH}\lfloor (n+N_{TTI}+P_{Rx}-(m'-m)N_{sf}-N_{g1})/n_{USSCH} \rfloor) \quad (11)$$

When $n_{USCCH}=1$ (block 1106), equation (11) may be simplified to equation (12) (block 1110):

$$m'=m+\lfloor (n+N_{TTI}+P_{Rx}+N_{g2}+N_u+N_{g3})/N_{sf} \rfloor$$

$$n'=\max(N_{g1}, n+N_{TTI}+P_{Rx}-(m'-m)N_{sf}) \quad (12)$$

Another method is optimized to distribute ACKCH uniformly with the calculation given in equation (13) (block 1108):

$$m' = m + \lfloor (n + N_{TTI} + P_{Rx} + N_d + N_{g2} + N_u + N_{g3} - 1 - n_{USCCH} \lfloor N_d - 1 \rfloor) / N_{sf} \rfloor$$

$$n' = N_{g1} + n_{USCCH} \cdot \max(\lfloor (n - N_{g1} - N_d - N_{g2}) N_u / n_{USCCH} / (N_u - N_{TTI} + 1) \rfloor, \lfloor (n + N_{TTI} + P_{Rx} - (m' - m) N_{sf} - N_{g1}) / n_{USCCH} \rfloor) \quad (13)$$

When $n_{USCCH} = 1$ (block 1106), equation (13) may be simplified to equation (14) (block 1110):

$$m' = m + \lfloor (n + N_{TTI} + P_{Rx} + N_{g2} + N_u + N_{g3}) / N_{sf} \rfloor$$

$$n' = \max(N_{g1} + \lfloor (n - N_{g1} - N_d - N_{g2}) N_d / (N_u - N_{TTI} + 1) \rfloor, n + N_{TTI} + P_{Rx} - (m' - m) N_{sf}) \quad (14)$$

Which method is used may be either fixed in a standard, or may be indicated per configuration or per mobile station.

Timing Relationship Between UL Data Burst Retransmission and ACKCH

Between the uplink data burst retransmission and ACKCH (TDD), the timing relationship rule 700 of FIG. 9 used for frequency-division duplexing may also be used for time-division duplexing. For uplink data bursts with the starting sub-frame transmitted in sub-frame (m,n) (block 702), the starting sub-frame position for uplink data burst retransmission is in sub-frame (m'',n'') (block 704). Equation (3) is used to calculate the starting sub-frame position (m'',n'') of the uplink data burst retransmission (block 706).

Figure 17:
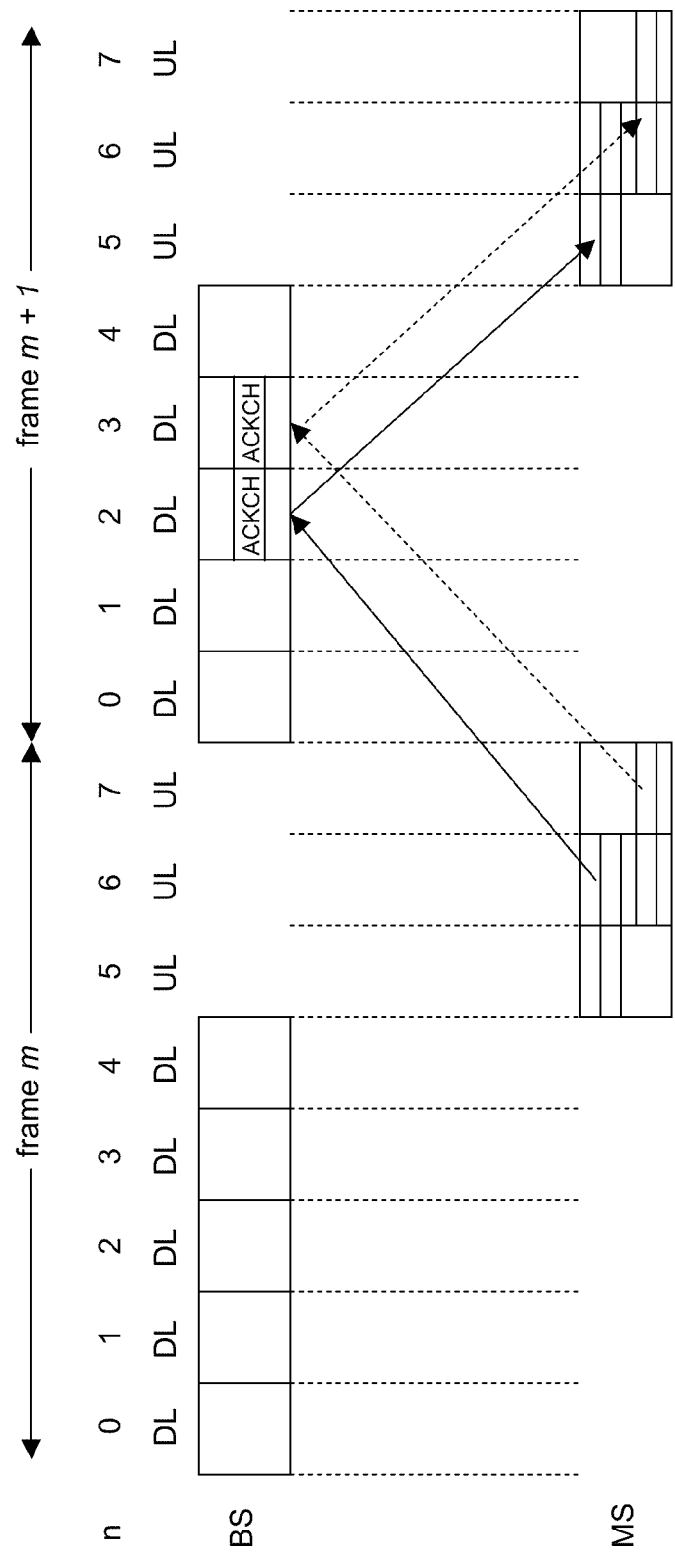
FIG. 17 is an illustration of TDD uplink HARQ used by the HARQ timing control method of FIG. 1, according to some embodiments.

FIG. 17 shows an example for time-division duplexing uplink HARQ, according to some embodiments. In this example, there are no gaps present, that is, $N_{g1} = N_{g2} = N_{g3} = 0$. There are eight sub-frames per frame, i.e. $N_{sf} = 8$. The DL:UL ratio is 5:3, i.e. $N_d = 5$, and $N_u = 3$. In addition, $N_{TTI} = 2, n_{USCCH} = 1$. Equation (11) and (3) are used to calculate HARQ timing. For instance, ACKCH for data transmission starting in the uplink sub-frame (m,5) is transmitted in the downlink sub-frame (m+1,2), with the uplink retransmission starting in sub-frame (m+1,5). ACKCH for data transmission starting in the uplink sub-frame (m,6) is transmitted in the downlink sub-frame (m+1,3), with uplink retransmission starting in sub-frame (m+1,6).

Applicability to Relay

The HARQ timing control method 100 may be applied to the relay station (RS) as well. Downlink HARQ may be applied to the following scenarios when data burst transmission occurs in the downlink zone (with "A→B" denoting "A transmits, B receives"):

BS→MS

BS→RS

RS→MS

Odd-Hop RS→Even-Hop RS

Even-Hop RS→Odd-Hop RS.

Uplink HARQ may be applied to the following scenarios when data burst transmission occurs in the uplink zone:

MS→BS

RS→BS

MS→RS

Even-Hop RS→Odd-Hop RS

Odd-Hop RS→Even-Hop RS

The HARQ timing control method 100 generalizes frame structure considering various factors affecting HARQ timing, and provides one unified algorithm to determine HARQ timing based on the generalized frame structure. The generalized frame structure manages various factors affecting HARQ timing. In the above equations used to calculate HARQ timing, symbols like $N_{TTI}$ and $n_{USCCH}$ are introduced to take into account the impact from variable TTI length and USCCH transmission frequency. The frame structure and HARQ operation follow that of IEEE 802.16m. HARQ timing is related to ACKCH transmission, in particular, how to determine the ACKCH index when the HARQ feedback for multiple sub-frames are collocated in one sub-frame.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method to establish a hybrid automatic repeat request (HARQ) operation in a transmitter running in a wireless network, the method comprising:
   utilizing, by the transmitter, a downlink frequency-division duplexing (FDD) frame to perform a downlink transmission, the downlink FDD frame comprising:
   a first downlink gap having a length, $N_{dg1}$;
   a downlink zone having a length, $N_d$, wherein the downlink zone comprises one or more sub-frames that are used for downlink data burst transmissions; and
   a second downlink gap having a length, $N_{dg2}$, wherein $N_{dg1}$, $N_d$, and $N_{dg2}$ are integer values of size zero or greater;
   utilizing, by the transmitter, an uplink frequency-division duplexing (FDD) frame to receive an uplink transmission, the uplink FDD frame comprising:
   a first uplink gap having a length, $N_{ug1}$;
   an uplink zone having a length, $N_u$; and
   a second uplink gap having a length, $N_{ug2}$, wherein $N_{ug1}$, $N_u$, and $N_{ug2}$ are integer values of size zero or greater;
   obtaining, by the transmitter, one or more network characteristics of the wireless network in which uplink and/or downlink transmissions are to take place, wherein the one or more network characteristics are selected from a group consisting of a number of sub-frames per uplink FDD frame, a variable transmission time interval length, whether a legacy zone is used, whether a relay zone is used, and whether an acknowledge channel (ACKCH) is used;
   wherein the transmitter utilizes one or more timing relationship rules, the network characteristics, and the downlink FDD frame, to perform downlink HARQ transmissions and to receive uplink HARQ transmissions.

2. The method of claim 1, further comprising:
   establishing, by the transmitter, a timing relationship rule between a downlink assignment in a user-specific control channel (USCCH) and a downlink data burst transmission, the timing relationship rule further comprising:
   where the USCCH transmission frequency is one, establishing the downlink data burst transmission corresponding to a downlink assignment in USCCH transmitted in sub-frame $(m_U, n_U)$ to begin in sub-frame $(m_U, n_U)$, wherein $(m_U, n_U)$ denotes a starting sub-frame position of pair (m,n), wherein pair (m,n) denote a frame, m, and a sub-frame, n; and
   where the USCCH transmission frequency is two, establishing the downlink data burst transmission corresponding to a downlink assignment in USCCH transmitted in sub-frame $(m_U, n_U)$ to begin in sub-frame $(m_U, n_U+i)$ for integer i;
wherein the USCCH transmission frequency is defined to be either one or two and the sub-frame.

3. The method of claim 1, further comprising:
establishing, by the transmitter, a timing relationship rule between a downlink data burst transmission and an acknowledge channel (ACKCH), the timing relationship rule further comprising:
calculating (m',n'), wherein ACKCH is to be transmitted in sub-frame (m',n') and the downlink data burst is transmitted in sub-frame (m,n), wherein pair (m,n) denote a frame, m, and a sub-frame, n.

4. The method of claim 3, wherein (m',n') is calculated according to the following formula:

$$m'=m+\lfloor(n+N_{TTI}+P_{Rx}+N_{ug2})/N_{sf}\rfloor$$

$$n'=\max(N_{ug1}, n+N_{TTI}+P_{Rx}-(m'-m)N_{sf}),$$

wherein $N_{TTI}$ is a TTI length of data burst (re)transmission in terms of number of sub-frames, $P_{Rx}$ a receive process time in terms of number of sub-frames, and $N_{sf}$ is a total number of sub-frames per frame.

5. The method of claim 3, wherein (m',n') is calculated according to the following formula:

$$k=N_d-N_{TTI}+1$$

$$m'=m+\lfloor(n+N_{TTI}+P_{Rx}+N_{ug2})/N_{sf}\rfloor$$

$$n'=\max(N_{ug1}+\lfloor(n-N_{dg1}+P_{Rx}+1)\bmod k \cdot N_u/k\rfloor, n+N_{TTI}+P_{Rx}-(m'-m)N_{sf})$$

wherein $N_{TTI}$ is a TTI length of data burst (re)transmission in terms of number of sub-frames, $P_{Rx}$ a receive process time in terms of number of sub-frames, and $N_{sf}$ is a total number of sub-frames per frame.

6. The method of claim 1, further comprising:
establishing, by the transmitter, a timing relationship rule between a downlink data burst retransmission and an acknowledge channel (ACKCH), the timing relationship rule further comprising:
calculating (m",n"), wherein the downlink data burst retransmission takes place in sub-frame (m',n') and the downlink data burst is transmitted in sub-frame (m,n), wherein pair (m,n) denote a frame, m, and a sub-frame, n.

7. The method of claim 6, wherein (m",n") is calculated according to the following formula:

$$m''=m'+\lfloor(n'+P_{Tx}-n)/N_{sf}\rfloor+1$$

$$n''=n,$$

wherein $P_{Tx}$ is a transmission processing time in number of sub-frames and $N_{sf}$ is a total number of sub-frames per frame.

8. The method of claim 6, wherein (m",n") is calculated according to the following formula:

$$m'' = \begin{cases} m' & \text{if } n'+P_{Tx} < n \\ m'+1 & \text{if } n'+P_{Tx} \geq n \end{cases}$$

wherein $P_{Tx}$ is a transmission processing time in terms of number of sub-frames.

9. The method of claim 1, further comprising:
establishing, by the transmitter, a timing relationship rule between an uplink assignment in a user-specific control channel (USCCH) and an uplink data burst transmission, the timing relationship rule further comprising:
when a field is present in the assignment, using the field to establish the timing relationship between USCCH and uplink data; and
when the field is not present, establishing a timing relationship between USCCH and uplink data, where uplink data for USCCH is transmitted in sub-frame (m,n), wherein pair (m,n) denote a frame, m, and a sub-frame, n.

10. The method of claim 9, wherein the timing relationship is established according to the following formula:

$$m=m_U+\lfloor(n_U+N_{TTI}+P_{Tx}+N_{ug2})/N_{sf}\rfloor$$

$$n=\max(N_{ug1}, n_U+N_{TTI}+P_{Tx}-(m-m_U)N_{sf})$$

wherein $N_{TTI}$ is a transmission time interval length of data burst (re)transmission in number of sub-frames, $P_{Tx}$ is a transmit processing time in number of sub-frames, and $N_{sf}$ is a total number of sub-frames per frame.

11. The method of claim 1, further comprising:
establishing, by the transmitter, a timing relationship rule between an uplink data burst transmission and an acknowledge channel (ACKCH), the timing relationship rule further comprising:
calculating (m',n'), wherein the ACKCH takes place in sub-frame (m',n') when the uplink data burst is transmitted in sub-frame (m,n), wherein pair (m,n) denote a frame, m, and a sub-frame, n.

12. The method of claim 11, wherein (m',n') is calculated according to the following formula:

$$m'=m+\lfloor(n+N_{TTI}+P_{Rx}+N_d+N_{dg2}-1-n_{USCCH}\lfloor(N_d-1)/n_{USCCH}\rfloor)/N_{sf}\rfloor$$

$$n'=N_{dg1}+\max(0, n_{USCCH}\lceil(n+N_{TTI}+P_{Rx}-(m'-m)N_{sf}-N_{dg1})/n_{USCCH}\rceil),$$

wherein $N_{TTI}$ is a transmission time interval length of data burst (re)transmission in number of sub-frames, $P_{Rx}$ is a receive processing time in number of sub-frames, $n_{USCCH}$ is a user-specific control channel transmission frequency, and $N_{sf}$ is a total number of sub-frames per frame.

13. The method of claim 11, wherein (m',n') is calculated according to the following formula:

$$m'=m+\lfloor(n+N_{TTI}+P_{Rx}+N_{dg2})/N_{sf}\rfloor$$

$$n'=\max(N_{dg1}, n+N_{TTI}+P_{Rx}-(m'-m)N_{sf}),$$

wherein $N_{TTI}$ is a transmission time interval length of data burst (re)transmission in number of sub-frames, $P_{Rx}$ is a receive processing time in number of sub-frames, and $N_{sf}$ is a total number of sub-frames per frame.

14. The method of claim 11, wherein (m',n') is calculated according to the following formula:

$$k=N_u-N_{TTI}+1$$

$$m'=m+\lfloor(n+N_{TTI}+P_{Rx}+N_d+N_{dg2}-1-n_{USCCH}\lfloor(N_d-1)/n_{USCCH}\rfloor)/N_{sf}\rfloor$$

$$n'N_{dg1}+n_{USCCH}\max(\lfloor(n-N_{ug1}+P_{Rx}+1)\bmod k \cdot N_d/n_{USCCH}/k\rfloor, \lceil(n+N_{TTI}+P_{Rx}-(m'-m)N_{sf}-N_{dg1})/n_{USCCH}\rceil)$$

wherein $N_{TTI}$ is a transmission time interval length of data burst (re)transmission in number of sub-frames, $P_{Rx}$ a receive processing time in number of sub-frames, $n_{USCCH}$ is a user-specific control channel transmission frequency, and $N_{sf}$ is a total number of sub-frames per frame.

15. The method of claim 11, wherein (m',n') is calculated according to the following formula:

$$k = N_u - N_{TTI} + 1$$

$$m' = m + \lfloor (n + N_{TTI} + P_{Rx} + N_{dg2})/N_{sf} \rfloor$$

$$n' = \max(N_{dg1} + \lfloor (n - N_{ug1} + P_{Rx} + 1) \bmod k \cdot N_d/k \rfloor, n + N_{TTI} + P_{Rx} - (m'-m)N_{sf}),$$

wherein $N_{TTI}$ is a transmission time interval length of data burst (re)transmission in number of sub-frames, $P_{Rx}$ a receive processing time in number of sub-frames, and $N_{sf}$ is a total number of sub-frames per frame.

16. The method of claim 1, further comprising:
establishing, by the transmitter, a timing relationship rule between an uplink data burst retransmission and an acknowledge channel (ACKCH), the timing relationship rule further comprising:
calculating (m", n"), wherein the uplink data burst transmission is to take place in sub-frame (m,n), wherein pair (m,n) denote a frame, m, and a sub-frame, n and the start sub-frame position for uplink data burst retransmission is in sub-frame (m",n");
wherein the following formula is used to calculate (m',n"):

$$m'' = m' + \lfloor (n' + P_{Tx} - n)/N_{sf} \rfloor + 1$$

$$n'' = n,$$

wherein $P_{Tx}$ is a transmission processing time in number of sub-frames.

17. A method to establish a hybrid automatic repeat request (HARQ) operation in a transmitter running in a wireless network, the method comprising:
utilizing, by the transmitter, a time-division duplexing (TDD) frame to perform uplink and downlink transmissions, the TDD frame comprising:
a first gap having a length, $N_{g1}$;
a downlink zone having a length, $N_d$;
a second gap having a length, $N_{g2}$;
an uplink zone having a length, $N_u$; and
a third gap having a length, $N_{g3}$, wherein $N_{g1}$, $N_d$, $N_{g2}$, $N_u$, and $N_{g3}$ are integer values of size zero or greater;
obtaining, by the transmitter, one or more network characteristics of the wireless network in which uplink and/or downlink transmissions are to take place, wherein the one or more network characteristics are selected from a group consisting of a variable transmission time interval length, whether a legacy zone is used, whether a relay zone is used, and whether an acknowledge channel (ACKCH) is used;
wherein the transmitter utilizes one or more timing relationship rules, the network characteristics, and the TDD frame, to perform HARQ transmissions.

18. The method of claim 17, further comprising:
establishing a timing relationship rule between a downlink assignment in a user-specific control channel (USCCH) and a downlink data burst transmission, the timing relationship rule further comprising:
when a field is present in the assignment, using the field to establish the timing relationship between downlink assignment in the USCCH and the downlink data burst transmission; and
when the field is not present, establishing a timing relationship as follows:
if USCCH transmission frequency is one, establishing the downlink data burst transmission corresponding to a downlink assignment in USCCH transmitted in sub-frame $(m_U, n_U)$ to begin in sub-frame $(m_U, n_U)$,
wherein pair (m,n) denote a frame, m, and a sub-frame, n, and $(m_U, n_U)$ denote a sub-frame position of USCCH scheduling data burst transmission or retransmission of (m,n); and
if USCCH transmission frequency is two, establishing the downlink data burst transmission corresponding to a downlink assignment in USCCH transmitted in sub-frame $(m_U, n_U)$ to begin in sub-frame $(m_U, n_U+i)$ for integer i;
wherein the USCCH transmission frequency is defined to be either one or two.

19. The method of claim 17, further comprising:
establishing a timing relationship rule between a downlink data burst transmission and an acknowledge channel (ACKCH), the timing relationship further comprising:
calculating (m',n'), wherein ACKCH is to be transmitted in sub-frame (m',n') and the downlink data burst is transmitted in sub-frame (m,n), wherein pair (m,n) denote a frame, m, and a sub-frame, n.

20. The method of claim 19, wherein (m',n') is calculated according to the following formula:

$$m' = m + \lfloor (n + N_{TTI} + P_{Rx} + N_{g3})/N_{sf} \rfloor$$

$$n' = \max(N_{g1} + N_d + N_{g2}, n + N_{TTI} + P_{Rx} - (m'-m)N_{sf}),$$

wherein $N_{TTI}$ is a transmission time interval length of data burst (re)transmission in number of sub-frames, $P_{Rx}$ a receive processing time in number of sub-frames, and $N_{sf}$ is a total number of sub-frames per frame.

21. The method of claim 19, wherein (m',n') is calculated according to the following formula:

$$m' = m + \lfloor (n + N_{TTI} + P_{Rx} + N_{g3})/N_{sf} \rfloor$$

$$n' = \max(N_{g1} + N_d + N_{g2} + \lfloor (n - N_{g1})N_u/(N_d - N_{TTI} + 1) \rfloor, n + N_{TTI} + P_{Rx} - (m'-m)N_{sf}),$$

wherein $N_{TTI}$ is a transmission time interval length of data burst (re)transmission in number of sub-frames, $P_{Rx}$ a receive processing time in number of sub-frames, and $N_{sf}$ is a total number of sub-frames per frame.

22. The method of claim 17, further comprising:
establishing a timing relationship rule between downlink data burst retransmission and an acknowledge channel (ACKCH), the timing relationship further comprising:
calculating (m",n"), wherein the downlink data burst retransmission takes place in sub-frame (m",n") and the downlink data burst is transmitted in sub-frame (m,n), wherein pair (m,n) denote a frame, m, and a sub-frame, n, wherein (m",n") is calculated using the following formula:

$$m'' = m' + \lfloor (n' + P_{Tx} - n)/N_{sf} \rfloor + 1$$

$$n'' = n,$$

wherein $P_{Tx}$ is a transmission processing time in number of sub-frames and $N_{sf}$ is a total number of sub-frames per frame.

23. The method of claim 17, further comprising:
establishing a timing relationship rule between an uplink data burst transmission and an acknowledge channel (ACKCH), the timing relationship further comprising:
where the ACKCH takes place in sub-frame (m',n') and the uplink data burst is transmitted in sub-frame (m,n), wherein pair (m,n) denote a frame, m, and a sub-frame, n, calculating (m',n').

24. The method of claim 23, wherein (m',n') is calculated according to the following formula:

$$m' = m + \lfloor (n + N_{TTI} + P_{Rx} + N_d + N_{g2} + N_u + N_{g3} - 1 - n_{USCCH} \lfloor (N_d-1)/n_{USCCH} \rfloor)/N_{sf} \rfloor$$

$$n' = N_{g1} + \max(0, n_{USCCH} \lceil (n + N_{TTI} + P_{Rx} - (m'-m)N_{sf} - N_{g1})/n_{USCCH} \rceil),$$

wherein $N_{TTI}$ is a transmission time interval length of data burst (re)transmission in number of sub-frames, $P_{Rx}$ a receive processing time in number of sub-frames, $n_{USCCH}$ is a user-specific control channel transmission frequency, and $N_{sf}$ is a total number of sub-frames per frame.

25. The method of claim 23, wherein (m',n') is calculated according to the following formula:

$$m' = m + \lfloor (n + N_{TTI} + P_{Rx} + N_{g2} + N_u + N_{g3})/N_{sf} \rfloor$$

$$n' = \max(N_{g1}, n + N_{TTI} + P_{Rx} - (m'-m)N_{sf}),$$

wherein $N_{TTI}$ is a transmission time interval length of data burst (re)transmission in number of sub-frames, $P_{Rx}$ a receive processing time in number of sub-frames, and $N_{sf}$ is a total number of sub-frames per frame.

26. The method of claim 23, wherein (m',n') is calculated according to the following formula:

$$m' = m + \lfloor (n + N_{TTI} + P_{Rx} + N_d + N_{g2} + N_u + N_{g3} - 1 - n_{USCCH} \lfloor (N_d-1)/n_{USCCH} \rfloor)/N_{sf} \rfloor$$

$$n' = N_{g1} + n_{USCCH} \max(\lfloor (n - N_{g1} - N_d - N_{g2}) N_d / n_{USCCH} / (N_u - N_{TTI} + 1) \rfloor, \lceil (n + N_{TTI} + P_{Rx} - (m'-m)N_{sf} - N_{g1})/n_{USCCH} \rceil),$$

wherein $N_{TTI}$ is a transmission time interval length of data burst (re)transmission in number of sub-frames, $P_{Rx}$ a receive processing time in number of sub-frames, $n_{USCCH}$ is a user-specific control channel transmission frequency, and $N_{sf}$ is a total number of sub-frames per frame.

27. The method of claim 23, wherein (m',n') is calculated according to the following formula:

$$m' = m + \lfloor (n + N_{TTI} + P_{Rx} + N_{g2} + N_u + N_{g3})/N_{sf} \rfloor$$

$$n' = \max(N_{g1} + \lfloor (n - N_{g1} - N_d - N_{g2}) N_d / (N_u - N_{TTI} + 1) \rfloor, n + N_{TTI} + P_{Rx} - (m'-m)N_{sf}),$$

wherein $N_{TTI}$ is a transmission time interval length of data burst (re)transmission in number of sub-frames, $P_{Rx}$ a receive processing time in number of sub-frames, and $N_{sf}$ is a total number of sub-frames per frame.

28. The method of claim 17, further comprising:
establishing a timing relationship rule between an uplink data burst retransmission and an acknowledge channel (ACKCH), the timing relationship rule further comprising:
calculating (m",n"), wherein the uplink data burst transmission is to take place in sub-frame (m,n), wherein pair (m,n) denote a frame, m, and a sub-frame, n, and the start sub-frame position for uplink data burst retransmission is in sub-frame (m",n"),
wherein (m",n") is calculated using the following formula:

$$m'' = m' + \lfloor (n' + P_{Tx} - n)/N_{sf} \rfloor + 1$$

$$n'' = n,$$

wherein $P_{Tx}$ is a transmission processing time in number of sub-frames and $N_{sf}$ is a total number of sub-frames per frame.

* * * * *

UNITED STATES PATENT AND TRADEMARK OFFICE
CERTIFICATE OF CORRECTION

PATENT NO. : 8,239,723 B2  
APPLICATION NO. : 12/512253  
DATED : August 7, 2012  
INVENTOR(S) : Yujian Zhang et al.

Page 1 of 2

It is certified that error appears in the above-identified patent and that said Letters Patent is hereby corrected as shown below:

On the Title page, in field (56), in column 2, under "Other Publications", line 3, delete "Eoljanin" and insert -- E Soljanin --, therefor.

In column 13, line 22, in claim 4, delete "$P_{Rx}$" and insert -- $P_{Rx}$ is --, therefor.

In column 13, line 34, in claim 5, delete "$P_{Rx}$" and insert -- $P_{Rx}$ is --, therefor.

In column 14, line 13-16, in claim 10, $$m = m_U + \lfloor (n_U + N_{TTI} + P_{Tx} + N_{ag2})/N_{sf} \rfloor$$

delete "$n = \max(N_{ag1}, n_U + N_{TTI} + P_{Tx}(m - m_U)N_{sf})$," and insert --
$$m = m_U + \lfloor (n_U + N_{TTI} + P_{Tx} + N_{ag2})/N_{sf} \rfloor$$
$$n = \max(N_{ag1}, n_U + N_{TTI} + P_{Tx} - (m - m_U)N_{sf})'$$
--, therefor.

In column 14, line 62, in claim 14, after "$N_{ag1})/n_{USCCH}])$," insert -- , --.

In column 14, line 64, in claim 14, delete "$P_{Rx}$" and insert -- $P_{Rx}$ is --, therefor.

In column 15, line 10, in claim 15, delete "$P_{Rx}$" and insert -- $P_{Rx}$ is --, therefor.

In column 15, line 11, in claim 15, delete "$N_{sf}$," and insert -- $N_{sf}$ --, therefor.

In column 15, line 23, in claim 16, delete "(m',n'):" and insert -- (m'',n''): --, therefor.

Signed and Sealed this  
Twenty-third Day of October, 2012

David J. Kappos  
*Director of the United States Patent and Trademark Office*

CERTIFICATE OF CORRECTION (continued)
U.S. Pat. No. 8,239,723 B2

In column 16, line 28, in claim 20, delete "$P_{Rx}$" and insert -- $P_{Rx}$ is --, therefor.

In column 16, line 40, in claim 21, delete "$P_{Rx}$" and insert -- $P_{Rx}$ is --, therefor.

In column 17, line 9, in claim 24, delete "$P_{Rx}$" and insert -- $P_{Rx}$ is --, therefor.

In column 17, line 20, in claim 25, delete "$P_{Rx}$" and insert -- $P_{Rx}$ is --, therefor.

In column 17, line 32, in claim 26, delete "$P_{Rx}$" and insert -- $P_{Rx}$ is --, therefor.

In column 18, line 10, in claim 27, delete "$P_{Rx}$" and insert -- $P_{Rx}$ is --, therefor.